B. H. OTIS.

SPRING-BED BOTTOMS.

No. 7,239. Reissued July 25, 1876.

Witnesses:

J. West Wagner.

J. H. Rutherford

Inventor:

Benjamin H. Otis, by Johnson & Johnson

Attys.

N. PETERS, PHOTO-LITHOGRAPHER, WASHINGTON, D. C.

UNITED STATES PATENT OFFICE.

BENJAMIN H. OTIS, OF NORA, ILLINOIS.

IMPROVEMENT IN SPRING BED-BOTTOMS.

Specification forming part of Letters Patent No. 149,149, dated March 31, 1874; reissue No. 7,239, dated July 25, 1876; application filed June 7, 1876.

*To all whom it may concern:*

Be it known that I, BENJAMIN H. OTIS, formerly of Havana, but now of Nora, in the county of Jo Daviess and State of Illinois, have invented certain new and useful Improvements in Springs for Bed-Bottoms and other purposes; and I do hereby declare that the following is a full, clear, and exact description thereof, reference being had to the annexed drawings, which make part of this specification, and in which—

Figure 1:
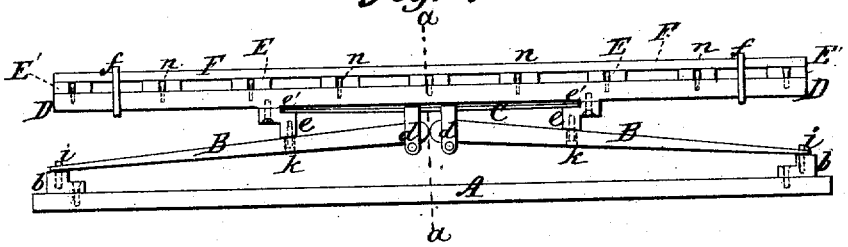
Figure 2:
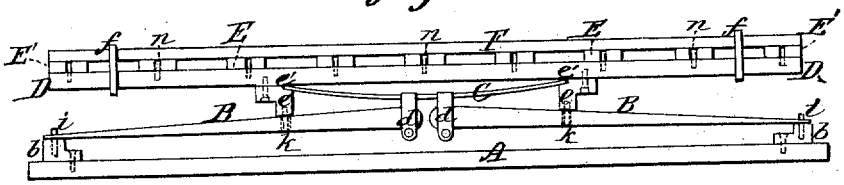
Figure 3:
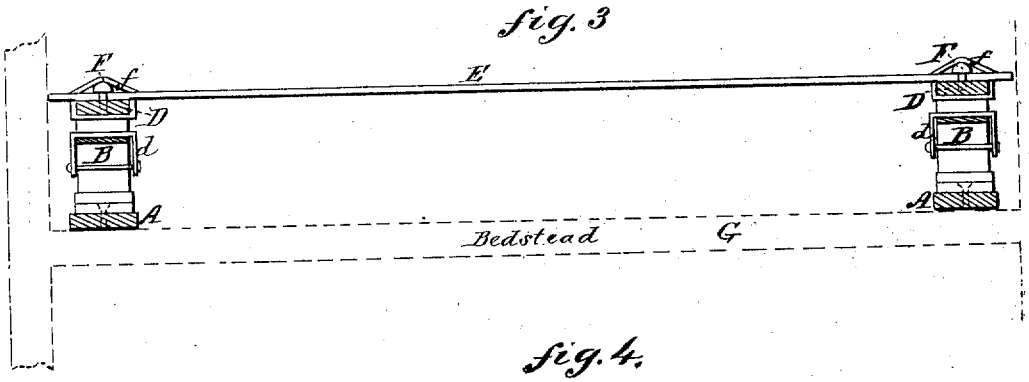
Figure 4:
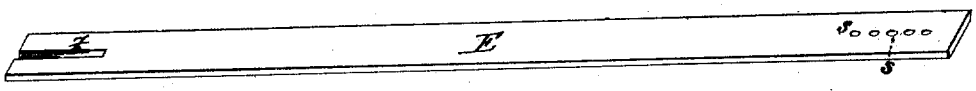
Figure 5:
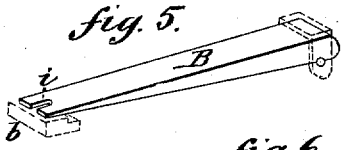
Figure 6:
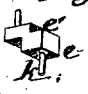

Figure 1 represents an end elevation of a bed-bottom with my improved spring applied thereto, and showing the center spring in its normal position; Fig. 2, a similar view, showing the center spring under pressure; Fig. 3, a longitudinal section taken at the line *a a* of Fig. 1; Fig. 4, one of the slats; Fig. 5, one of the main springs, and Fig. 6 one of the fulcrum-blocks for the main springs.

The spring consists of a straight center spring, which is supported at its ends in recesses in bracket-bearings, and united by clips to the inner ends of the main springs, with which the bearing-brackets are combined, and which depend from the supported frame or body. The bearing-brackets are provided with pins, which pass through the main springs, and maintain their clip-united ends in line, and thus prevent their lateral displacement. The bearing-brackets, by this construction, serve the special function of causing the main springs to act with a downward thrust upon the center spring, and thereby give an easy action to the connected springs, for, were it not for this bearing-connection of the body or frame upon the main springs, the center spring, being straight, would have no action at all auxiliary to the main spring. While these bearing-brackets serve this important function, they also serve as supports and bearings for the ends of the straight center spring.

As shown, the springs are applied to two cross-bars, A A, within the bedstead, being held in place by pins *i* passing through slots in the ends of the main springs B B, said pins projecting from blocks *b b* on the cross-bars. These springs B B are arranged in pairs at each end of the frame or body to be supported, their upper or contiguous ends having each a recess in the under surface to fit upon a horizontal pin of a loop or clip, *d*, which serves to unite the main and the center spring B and C, the latter passing through the upper portion of these clips, in contact with the ends of the main springs, and having its ends secured in recesses *e'*, formed in the bearing-brackets *e*, which are secured to and depend from the supported frame or body; or the ends may be secured by pins and slots or bolts, or equivalent fastenings. The center straight springs C C may be placed with equal advantage within the clips *d d* beneath the main springs.

The bars D D rest upon the bearing-brackets *e e*, and to which they are fastened. Said brackets have also a short pin or nipple, *k*, on their under sides, to enter holes in the main springs B B at the points where they bear upon them, to hold the springs in line and keep them from being displaced sidewise, while the recesses *e' e'* in their inner sides receive and confine the ends of the center straight spring C, and form bearings therefor broad enough to accommodate the flexure of said spring without danger of its ends sliding out of place. The supported bars D D are provided with vertical pins *n* on their upper surfaces to hold the slats E, which have corresponding holes S at one end and slots *z* at the other, to adapt them to the length of the bed-bottom, or distance between the bars D D.

The outside bed-slats E' E', one at each side, have no slots, but have a row of holes at both ends, in order to tie the bars D D and prevent the bed-bottom from spreading. These slats are all kept down by a transverse rod of wood or iron, F F, at their ends, which rods are confined in place by rubber bands *f f*, or similar device, which pass round each end of the rods and bars.

The center spring C is shown in Fig. 2 curved, because drawn down by the main springs. The action of this spring is as follows: The weight being applied upon the supported frame, the pressure is divided by the bearing-brackets *e e* equally upon the main springs B B and the steel center spring C, and causes thereby the contiguous ends of the main springs to be depressed in proportion to the flexure of the center connected spring, and thus cause the latter to act with a downward pull exerted at the middle of its length, as the brackets *e e* are arranged to act outside of the center spring. When there is no pressure upon the springs, the center spring C, by reason of being straight, lies parallel with the frame or bar D, and in contact with the under side thereof, which gives the advantage of a more compact arrangement. The contiguous ends of the main springs B may be confined by a single clip, and connected to the center spring, which crosses the elevated ends of the main springs.

The bearing-brackets *e e* are secured at suitable distances on each side of the clips, and only sufficient distance apart to receive a comparatively short center spring, and have their bearings on each side of the contiguous ends of the main springs.

I claim—

1. The combination, with the depending bearing-brackets *e e* and the main springs B B, of the center straight spring C and the connecting-clips *d d*, substantially as herein set forth.

2. The bearing-brackets *e e*, provided with bearing and holding recesses *e′ e′*, in combination with the straight center spring C and the main springs, as described.

3. The slats E, provided with the elongated slots *z* and holes *s*, in combination with the rod F, rubber band *f*, and bars D, provided with pins *n*, substantially as and for the purpose set forth.

In testimony whereof I have affixed my signature in the presence of two witnesses.

BENJAMIN H. OTIS.

Witnesses:
WM. TAYLOR,
LUCY R. TAYLOR.